United States Patent
Kaneko

[11] Patent Number: 5,932,990
[45] Date of Patent: Aug. 3, 1999

[54] CHARGING CONTROL SYSTEM FOR UNIFORMLY CHARGING A SERIES CONNECTED BATTERY ARRAY

[75] Inventor: Akira Kaneko, Shirakawa, Japan

[73] Assignees: Intergran, Inc.; Japan Tobacco, Inc., both of Tokyo, Japan

[21] Appl. No.: 08/856,314

[22] Filed: May 14, 1997

[30] Foreign Application Priority Data

Aug. 21, 1996 [JP] Japan .................................. 8-219520

[51] Int. Cl.$^6$ .................................................. H01M 10/46
[52] U.S. Cl. .......................................................... 320/122
[58] Field of Search .................................... 320/116, 118, 320/119, 120, 122, FOR 105, FOR 114, FOR 115, FOR 116, FOR 117, FOR 142

[56] References Cited

U.S. PATENT DOCUMENTS

| | | | |
|---|---|---|---|
| 4,614,905 | 9/1986 | Petersson et al. | |
| 5,469,042 | 11/1995 | Ruhling | 320/122 |
| 5,523,668 | 6/1996 | Feldstein | 320/119 X |
| 5,578,914 | 11/1996 | Morita | 320/122 |
| 5,617,004 | 4/1997 | Kaneko | 320/119 |
| 5,644,209 | 7/1997 | Chabbert et al. | 320/122 |

FOREIGN PATENT DOCUMENTS

| | | |
|---|---|---|
| 628491 | 4/1994 | Japan . |
| 833219 | 2/1996 | Japan . |

Primary Examiner—Edward H. Tso

[57] ABSTRACT

A charging control system for use with a battery charger for charging a battery array which is constituted by battery cells includes charging control units corresponding individually to the battery cells. Each unit includes a voltage-regulator circuit for generating a reference voltage corresponding to the fully charged voltage of the battery cell and a comparator for comparing the inter-electrode voltage of the battery cell with the reference voltage. When the inter-electrode voltage has reached the fully charged voltage, the comparator cooperates with an amplifier to turn ON a field-effect transistor of a bypass circuit of the unit, to thereby divert the charging current from to the battery cell to the bypass circuit. The amplifier receives a feedback voltage indicating the bypass current and operates to keep the bypass current constant, thereby preventing overcharging of the battery cell.

18 Claims, 5 Drawing Sheets

CHARGING CONTROL SYSTEM FOR UNIFORMLY CHARGING A SERIES CONNECTED BATTERY ARRAY

BACKGROUND OF THE INVENTION

1. Field of the Invention

This invention relates generally to apparatus for charging a battery and more particularly, to a charging control system suitable for uniformly charging a plurality of serially-connected battery cells.

2. Description of the Related Art

Recently, industrial robots and electric vehicles using battery cells as power sources are actively developed. Conventionally, lead battery is exclusively used in this field of application, but in recent years, attempts are made to use Ni-Cd battery, Li battery and Ni-H battery, etc. with high energy density. This type of battery generally has an output power of 2.0 to 4.2 V per unit cell. In the case of mounting battery cells on an electric vehicle, a required number of battery cells are serially connected with one another, to thereby derive a desired voltage.

When a battery array comprised of serially-connected battery cells is charged, it is a common practice to pass a preset current between the two electrodes of the battery array so as to charge each of the battery cells. However, in addition to the presence of variations in the characteristics of individual battery cells caused in the manufacturing process, there occurs differences in their internal resistances due to different heat radiating conditions caused by differences in the positions where the battery cells are disposed in the battery array. Thus, all the serially-connected battery cells are not uniform in their characteristics (battery capacities).

If the battery cells are charged by passing a current between the two terminals of the battery array in spite of the above fact, a battery cell having a small recharging capacity, i.e., low performance, is excessively charged, whereas a battery cell having a large recharging capacity, i.e., high performance, is insufficiently charged. Thus, if the charging and discharging operations of the battery array are repeatedly effected, even the characteristic of a battery cell of high performance is degraded and the service lives of all of the serially-connected battery cells are shortened.

To solve these problems, a technique for equalizing the charging voltages of the battery cells is disclosed in, e.g., Japanese Patent Application KOKOKU Publication No. 6-28491 in which charge regulators each connected to a corresponding one of serially-connected battery cells are provided, and a charging current is diverted from a battery cell concerned to an associated one charge regulator according to the charging voltage of the concerned battery cell.

In order to prevent a particular one or ones of the battery cells from being fully discharged, the technique disclosed in the above Publication is operable to supply each battery cell with a trickle charging current of, e.g., 300 mA corresponding to a self-discharging current of the battery cell. To regulate the trickle charging current, resistance values of impedance circuits respectively connected in parallel with the battery cells are changed, to thereby continuously change electric currents flowing through the impedance circuits according to the charging voltages of the battery cells.

In the case of a battery array mounted on an electric vehicle or the like, the battery array is ordinarily charged when the remaining capacity of the battery array is considerably lowered, and hence a charging current of several tens of ampere is to be supplied to the battery array. From this point of view, it is not practical to carry out the diversion or bypass control for such a large charging current based on the technique disclosed in the above Publication since the load loss in the impedance circuits becomes extremely large in that case.

Conventionally, therefore, a measure is taken in which serially-connected battery cells constituting a battery array are simultaneously charged independently of one another by use of a battery charger array which is connected in series with the battery array, as disclosed in Japanese Patent Application KOKAI Publication No. 8-33219, for example. The battery charger array disclosed therein includes battery chargers which are the same in number as the battery cells. Each battery charger includes a rectifier for converting an AC voltage supplied from an AC power source into a DC voltage, a charging voltage supplying unit connected with the rectifier, and a control section for controlling the charging voltage according to the temperature of the battery cell. This system has such a drawback that it requires a relatively large number of component parts.

SUMMARY OF THE INVENTION

An object of this invention is to provide a charging control system which is capable of uniformly and stably charging serially-connected battery cells and lengthening their service lives.

Another object of this invention is to provide a charging control unit suitable for constructing a charging control system of the just-mentioned type.

According to one aspect of this invention, there is provided a charging control system for use with a battery charger for charging a battery array comprised of serially-connected battery cells.

The charging control system comprises charging control units which are the same in number to the battery cells and each charging control unit is adapted to be connected in parallel with an associated one of the battery cells.

Each of the charging control units includes a bypass circuit connected in parallel with the associated one battery cell. The bypass circuit includes a semiconductor switching device. Each of the charging control units further includes a reference voltage generator circuit for generating a reference voltage, and a comparator circuit for comparing an inter-electrode voltage of the associated one battery cell with the reference voltage. When the inter-electrode voltage exceeds the reference voltage, the comparator circuit switches the operation state of the switching device from a cutoff state to a conductive state, to thereby divert a charging current for the associated one battery cell to the bypass circuit. Each of the charging control units further includes a bypass current adjuster circuit which is operable to keep an electric current diverted to and flowing through the bypass circuit constant.

The charging control system of this invention is advantageous in that a detection to see whether or not the inter-electrode voltage of each of the battery cells constructing the battery array has reached the reference voltage can be made with high sensitivity by the comparator circuit, and the individual battery cell can be effectively prevented from being overcharged by forcedly bypassing a charging current, ordinarily supplied from the battery charger to the battery cell, to the bypass circuit by the agency of the comparator circuit and the bypass current adjuster circuit, if the inter-electrode voltage of the battery cell concerned reaches the reference voltage. As a result, the charging voltages of the battery cells can be easily and efficiently equalized. Since the semiconductor switching device to selectively render the bypass circuit conductive or cutoff is provided in the bypass circuit, the battery array can be charged without causing any undesired loss. Since the battery array can be charged by use of a single battery charger, the system construction can be made simple when viewing the battery charger and the charging control system as a whole.

Preferably, the semiconductor switching device is comprised of a high-power field-effect transistor. This arrangement is suitable for charging a battery array of a large capacity.

Preferably, the reference voltage generator circuit includes a step-up circuit for stepping up the inter-electrode voltage of the associated one battery cell and for outputting the thus stepped-up voltage as its output voltage, and a voltage-regulator circuit for generating the reference voltage based on the output voltage of the step-up circuit.

Preferably, the reference voltage generator circuit generates a plurality of different reference voltages. The comparator circuit includes a plurality of comparators connected in parallel with one another. Each of the comparators has a first input terminal thereof directly supplied with the inter-electrode voltage of the associated one battery cell and a second input terminal thereof supplied with a corresponding one of the plurality of reference voltages, compares the inter-electrode voltage with the corresponding one reference voltage, and generates an output indicating a result of the comparison. Outputs of the plurality of comparators are added together and supplied to the semiconductor switching device.

With this arrangement, the bypass current value for each battery cell can be increased stepwise within a desired inter-electrode voltage region with the increase in the inter-electrode voltage of the battery cell, and therefore, the bypass current control and hence the charging voltage control of each battery cell can be carried out appropriately.

Preferably, each of the charging control units is formed into a module structure in which the bypass circuit, reference voltage generator circuit, comparator circuit and bypass current adjuster circuit are sealed with mold-sealing. The module structure has two connector terminals exposed to the external surface of the module structure, and is adapted to be connected at its two connector terminals with the positive and negative electrodes of the associated one battery cell.

With this arrangement, handling of the charging control unit can be simplified.

According to another aspect of this invention, there is provided a charging control unit for use with a battery charger operable to charge a battery array comprised of serially-connected battery cells. The charging control unit is adapted to be connected in parallel with an associated one of the battery cells.

The charging control unit comprises a bypass circuit connected in parallel with the associated one battery cell. The bypass circuit includes a semiconductor switching device. The charging control unit further includes a reference voltage generator circuit for generating a reference voltage, and a comparator circuit for comparing an inter-electrode voltage of the associated one battery cell with the reference voltage. When the inter-electrode voltage exceeds the reference voltage, the comparator circuit switches the operation state of the switching device from a cutoff state to a conductive state, to thereby divert a charging current for the associated one battery cell to the bypass circuit. The charging control unit further includes a bypass current adjuster circuit which is operable to keep an electric current diverted to and flowing through the bypass circuit constant.

The charging control unit is suitable to construct a charging control system of a type used with a battery charger to charge serially-connected battery cells and permitting uniform charging of the battery cells.

DETAILED DESCRIPTION

With reference to accompanying drawings, a charging control system according to a first embodiment of this invention will be explained.

Figure 1:
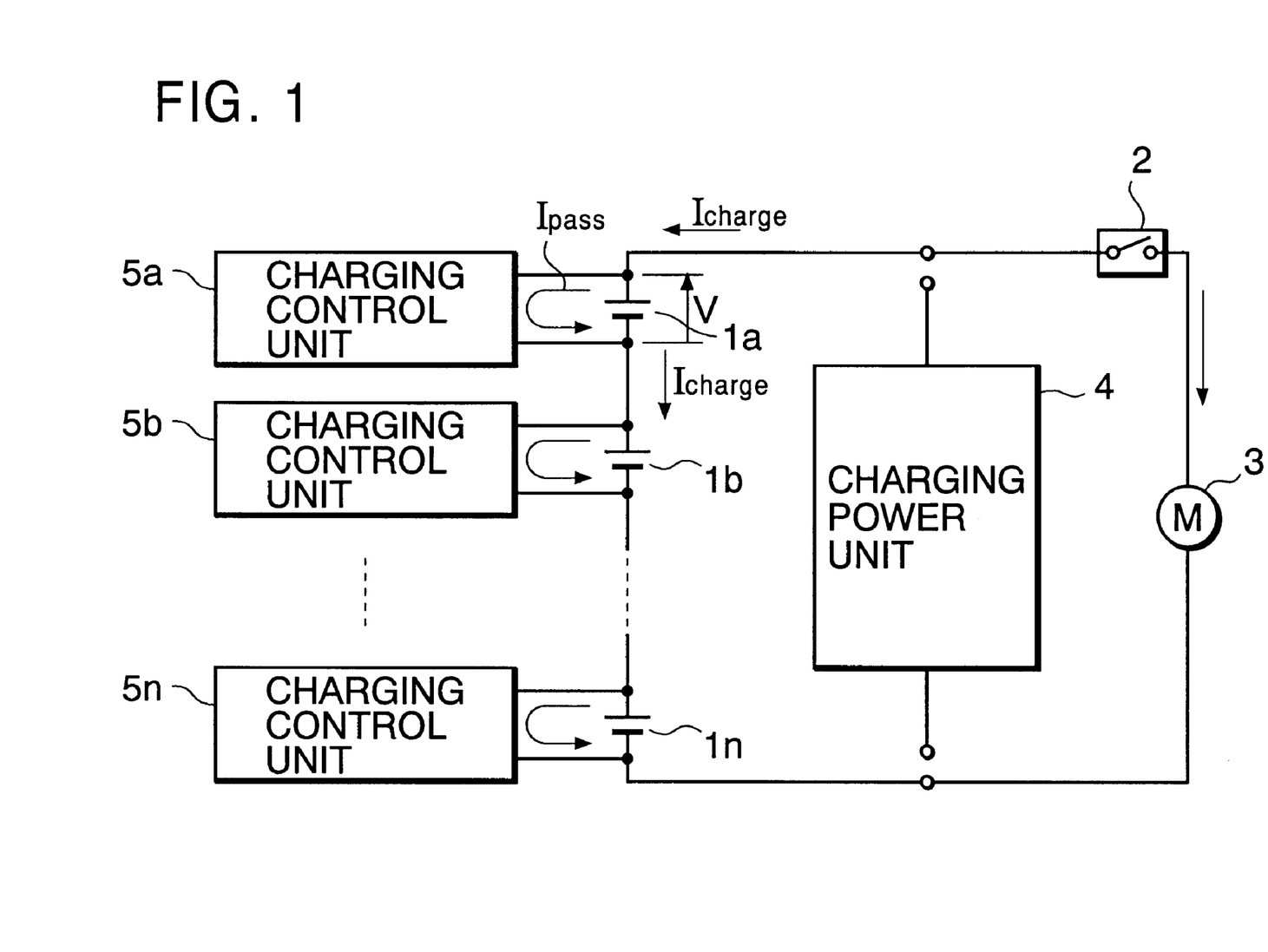
FIG. 1 is a schematic diagram showing a charging control system according to one embodiment of this invention.

In FIG. 1, reference numerals $1a$, $1b$, ..., $1n$ denote battery cells connected in series with one another. The battery cells $1a$ to $1n$ may be lead batteries which are generally used, or may be Ni-Cd batteries, Li batteries, Li-H batteries, etc.

A battery array constituted by the battery cells $1a$ to $1n$ is connected, e.g., via a switch 2, to a load 3 such as a motor and is used as a power source for driving the load 3. A charging power source 4 (more generally, battery charger) is adapted to be selectively connected between the two electrodes (terminals) of the battery array. When the charging power source 4 is electrically connected to the battery array to charge the battery array, a charging current $I_{charge}$ is supplied from the charging power source 4 to the battery array to charge the battery cells $1a$ to $1n$.

Each of charging control units $5a$, $5b$, ..., $5n$ is connected between the two electrodes of a corresponding one of the battery cells $1a$, $1b$, ..., $1n$. In the following description, an arbitrary one or ones of the battery cells $1a$ to $1n$ are denoted by reference numeral 1 and an arbitrary one or ones of the charging control units $5a$ to $5n$ are denoted by reference numeral 5.

The charging control unit 5 has a function of diverting the charging current $I_{charge}$ for the battery cell 1 from the battery cell to the charging control unit 5 when an inter-electrode voltage or electrode-to-electrode voltage V of the battery cell 1 associated with the charging control unit 5 has reached a desired reference voltage, for example, a fully charged voltage $V_{full}$ of the battery cell 1. The inter-electrode voltage indicates the voltage which appears across the battery cell concerned.

Figure 2:
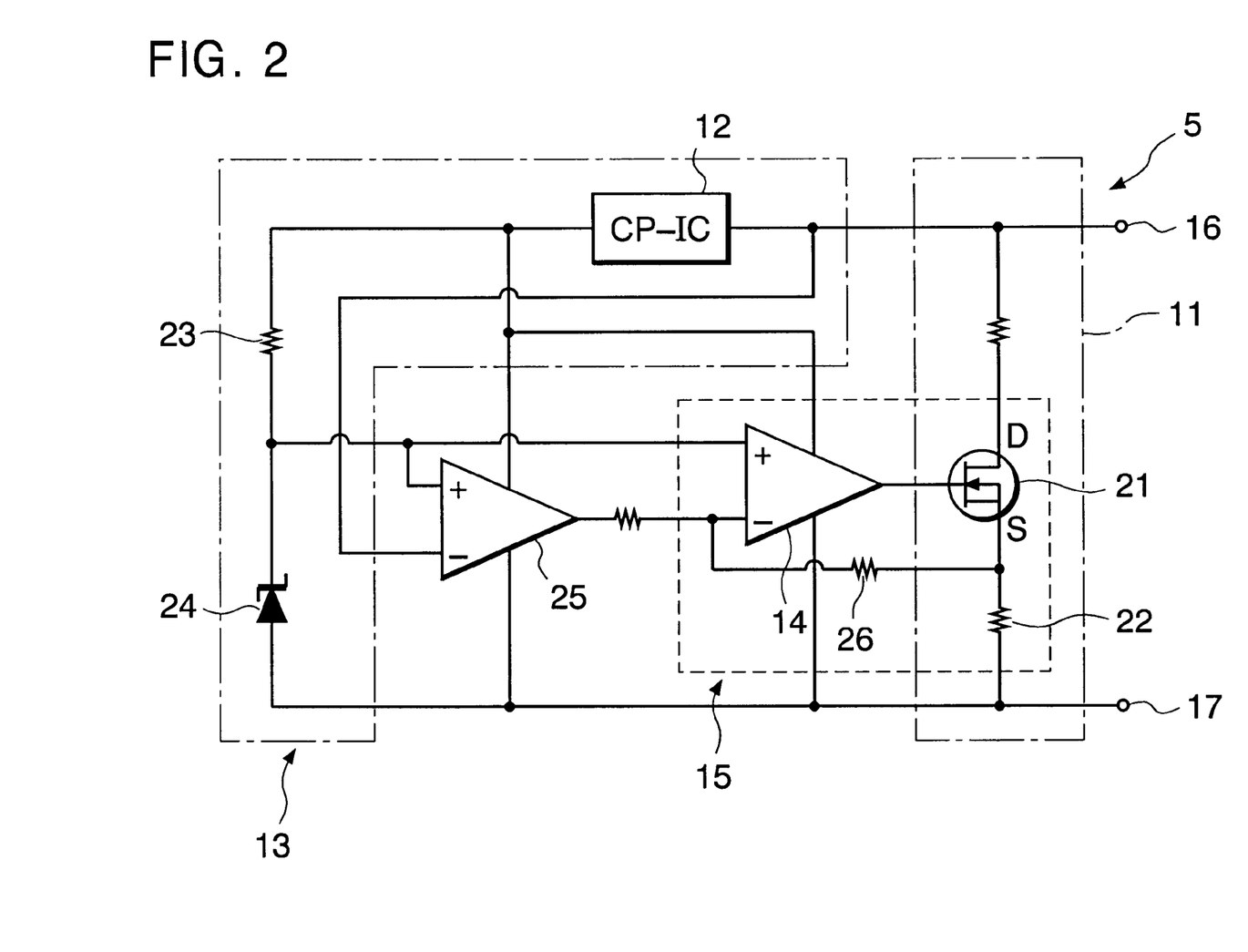
FIG. 2 is a schematic circuit diagram showing a charging control unit shown in FIG. 1.

As shown in FIG. 2, the charging control unit 5 includes a positive terminal 16 and negative terminal 17 which are respectively connected to the positive and negative electrodes of the battery cell 1, a bypass circuit 11 having two terminals thereof respectively connected to the positive and negative terminals 16 and 17, and a voltage-regulator circuit 13 which includes a step-up circuit 12.

The bypass circuit 11 includes a semiconductor switching device 21. The switching device 21 is preferably comprised of a low-voltage operated high-power field-effect transistor, e.g., a MOS-FET (manufactured by, e.g., Fuji Electric Co., Ltd. in Japan; type-name 2SK-1969-01). The FET 21 has a drain electrode D thereof connected to the positive electrode of the battery cell 1 via the positive terminal 16, and a source electrode thereof connected to the negative electrode of the battery cell 1 via the negative terminal 17.

The step-up circuit 12 is connected at its input terminal with the positive electrode of the battery cell 1 via the positive terminal 16. The step-up circuit 12 operates to step up the inter-electrode voltage (charging voltage) of the battery cell 1 and outputs a resultant stepped-up voltage as its output voltage. Specifically, the step-up circuit 12 is comprised of, e.g., a low-power voltage doubler regulator (manufactured by, e.g., Linear Technology Inc. in the USA.; type-name LTC-1044) which is called a charge pump IC, and operates to step up an input voltage V to a voltage which is approximately twice the input voltage, for example.

The voltage-regulator circuit 13 is designed to generate a reference voltage $V_{full}$ from the stepped-up voltage. Specifically, the voltage-regulator circuit 13 includes the step-up circuit 12, a protection resistor 23, and a voltage regulator 24 (manufactured by, e.g., Texas Instruments Inc. in the USA.; type-name TL-431) for generating the reference voltage $V_{full}$. One end of the protection resistor 23 is connected to the output terminal of the step-up circuit 12. The voltage regulator 24 has one end thereof connected to the other end of the protection resistor 23 and the other end thereof connected to the negative terminal 17 of the charging control unit 5. The reference voltage $V_{full}$ generated by the voltage regulator 24 can be variably set (finely adjusted) by a trimmer (not shown).

The charging control unit 5 further includes a comparator circuit 25 for comparing the inter-electrode voltage V of the battery cell 1 with the reference voltage $V_{full}$. This comparator circuit 25 is comprised of a comparator (manufactured by, e.g., Motorola, Inc. in the USA.; type-name LM-393) and is operated at the stepped-up voltage supplied, as drive voltage, from the step-up circuit 12 to the comparator circuit.

The comparator circuit 25 has an inverting input terminal thereof connected to the positive terminal 16 of the charging control unit 5 and an non-inverting input terminal thereof connected to a node between the resistor 23 and the voltage regulator 24. The comparator circuit 25 is designed to be supplied, via the positive terminal 16, at its inverting input terminal with the inter-electrode voltage V and operates to compare the voltage V with the reference voltage (fully charged voltage $V_{full}$) generated by the voltage-regulator circuit 13 and supplied at the non-inverting input terminal of the circuit 25, and generate an output voltage the level of which varies depending on the result of the comparison. More specifically, a high-level output voltage is generated by the comparator circuit 25 when the inter-electrode voltage V of the battery cell 1 is lower than the reference voltage $V_{full}$, whereas a low-level output voltage is generated thereby when the inter-electrode voltage V is equal to or higher than the reference voltage $V_{full}$.

The charging control unit 5 further includes a high-gain amplifier circuit 14 which is mainly comprised of a high-gain operational amplifier (manufactured by, e.g., Motorola, Inc. in the USA; type-name LM-10) and which is supplied with the stepped-up voltage, as drive voltage, from the step-up circuit 12. The amplifier circuit 14 has a non-inverting input terminal thereof connected to a node between the resistor 23 and the voltage regulator 24, and an inverting input terminal thereof connected through a resistor with the output terminal of the comparator circuit 25. The amplifier circuit 14 is designed to generate an output voltage which varies depending on the difference between the reference voltage vmax supplied with its non-inverting input terminal and the output voltage of the comparator circuit 25 supplied with the inverting input terminal of the amplifier circuit 14. The thus generated output voltage of the amplifier circuit 14 is applied to the gate electrode of the FET 21.

The comparator circuit 25 is so designed that its high-level output voltage permits the amplifier circuit 14 to output a zero-level output voltage which renders the FET 21 to be cutoff, and that the low-level output voltage of the comparator circuit 25 permits the amplifier circuit 14 to produce an output voltage (gate voltage) such as to render the FET 21 to be conductive and such as to permit almost the entirety of the charging current for the battery cell to be diverted to the bypass circuit 11. For example, the comparator circuit 25 is designed to output the high-level output voltage which is equal to the reference voltage vmax and the low-level output voltage which is lower than the reference voltage vmax by a desired voltage difference. To this end, the comparator circuit 25 has an appropriate circuit configuration including the resistance values of external resistors (not shown) for operating as a comparator circuit.

When the FET 21 is rendered to be conductive, therefore, almost the entire portion of the charging current $I_{charge}$ for the battery cell 1 is bypassed and flows into the bypass circuit 11, so that the bypass current $I_{pass}$ (corresponding to a drain current flowing between the drain electrode D and the source electrode S of the FET 21) flows through the bypass circuit 11.

In combination with the hysteresis characteristic of the comparator circuit 25, the FET 21 made once conductive is operated to be brought in a cutoff state at the time when the inter-electrode voltage V of the battery cell 1 becomes lower than a stationary operating voltage $V_{std}$ of the battery cell 1 because of the self-discharging action of the battery cell 1, for example. If the battery cell 1 is comprised of a lithium-ion battery, the stationary operating voltage $V_{std}$ is set to a voltage of, e.g., 4.0 V which is slightly lower than the fully charged voltage $V_{full}$ (4.1 V) (refer to FIG. 3).

If the battery cell 1 is a lead battery, the fully charged voltage $V_{full}$ and the stationary operating voltage $V_{std}$ are set to 2.6 V and 2.2 V, respectively, for example.

The charging control unit 5 further includes a negative feedback circuit 15 which serves as a bypass current adjuster circuit for keeping the bypass current $I_{pass}$ constant. The negative feedback circuit 15 includes a current detection resistor 22 for detecting the bypass current which resistor has opposite ends thereof respectively connected to the source electrode S of the FET 21 and the negative terminal 17 of the battery cell 1, and a feedback resistor 26 having two ends thereof respectively connected to the FET-side end of the resistor 22 and the inverting input terminal of the amplifier circuit 14. The voltage across the resistor 22 indicative of the magnitude of the bypass current is fed back to the inverting input terminal of the amplifier circuit 14.

The voltage (negative feedback voltage) across the resistor 22 becomes higher as the bypass current $I_{pass}$ increases. Thus, due to application of the negative feedback voltage, the absolute value of the low-level output voltage applied to the inverting input terminal of the amplifier circuit 14 becomes smaller as the bypass current $I_{pass}$ increases. In other words, the difference between the reference voltage applied to the non-inverting input terminal of the amplifier circuit 14 and the low-level voltage applied to the inverting input terminal thereof becomes smaller, so that the output voltage of the amplifier circuit 14 becomes smaller, as the bypass current $I_{pass}$ increases. On the other hand, the output voltage of the amplifier circuit 14 becomes larger as the bypass current $I_{pass}$ decreases. In this manner, the bypass current is kept constant.

Next, the operation of the charging control system 5 with the above construction is explained.

When the positive and negative terminals of the battery array are connected to the positive and negative terminals of the charging power source 4 at the time of charging the battery array constituted by the battery cells $1a$ to $1n$, a charging current $I_{charge}$ is supplied from the charging power source 4 to the battery array to charge the same. As a result of supply of the charging current, the inter-electrode voltages of the battery cells gradually rise.

The inter-electrode voltage of each battery cell 1 is supplied to the step-up circuit 12 of a corresponding one of the charging control units 5 and is stepped up to a voltage which is approximately twice the input voltage V in the step-up circuit 12. The stepped-up voltage is supplied to the voltage regulator 24 via the resistor 23. The voltage regulator 24 generates a reference voltage corresponding to the fully charged voltage $V_{full}$ of the battery cell 1. While the inter-electrode voltage V of the battery cell is low, a voltage generated by the regulator 24 does not reach the reference voltage $V_{full}$. During this time, the inter-electrode voltage V of the battery cell 1 will not reach the voltage generated by the regulator, and no special problem occurs.

The comparator circuit 25 of each charging control unit 5 directly compares the inter-electrode voltage V of the concerned battery supplied to its inverting input terminal with the reference voltage $V_{full}$ supplied to its non-inverting input terminal, to thereby determine whether or not the inter-electrode voltage V has reached the reference voltage $V_{full}$ with high sensitivity.

When the inter-electrode voltage V of the battery cell 1 has reached the reference voltage $V_{full}$, the comparator circuit 25 outputs a low-level voltage. As a result, there occurs a difference between voltages respectively applied to the non-inverting and inverting input terminals of the amplifier circuit 14, and hence a positive gate voltage is applied from the amplifier circuit 14 to the gate electrode of the FET 21, so that the FET 21 is changed over from a cutoff state to a conduction state.

When the FET 21 is made conductive, a major part of the charging current $I_{charge}$ for the battery cell 1 is bypassed to the bypass circuit 11, so that the bypass current $I_{pass}$ (corresponding to the drain current of the FET 21) flows through the bypass circuit 11.

The value of the bypass current $I_{pass}$ is detected by the current detection resistor 22. The voltage across the resistor 22, indicative of the value of the bypass current, is fed back to the inverting input terminal of the amplifier circuit 25 via the feedback resistor 26. As explained in the above, this negative feedback makes the bypass current $I_{pass}$ constant.

Figure 3:
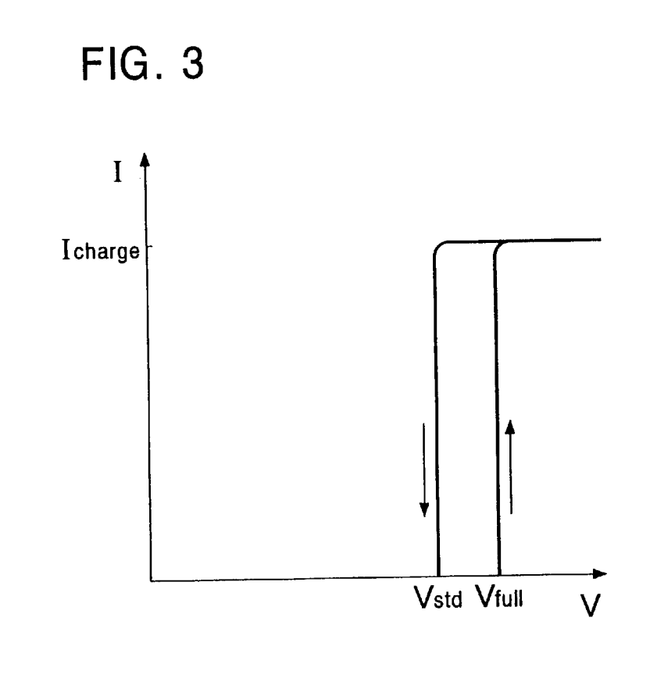
FIG. 3 is a graph showing the inter-electrode voltage-to-bypass current characteristic of the charging control unit shown in FIG. 2.

As a result, as shown in FIG. 3, almost the entirety of the charging current $I_{charge}$ supplied from the charging power source 4 to the battery cell 1, e.g., the battery cell $1a$, is forcedly drawn into the bypass circuit 11 when the inter-electrode voltage V of the battery cell $1a$ has reached its fully charged voltage $V_{full}$. As a result, the supply of the charging current to the battery cell $1a$ is substantially interrupted to prevent overcharging of the battery cell $1a$ while maintaining the inter-electrode voltage V of the battery cell $1a$ at the fully charged voltage $V_{full}$.

To be noted, the charging current $I_{charge}$ for the fully charged battery cell 1 is forcedly bypassed by the bypass circuit 11 including the FET 21. This makes it possible to prevent occurrence of a large load loss which occurs in the case of using the impedance circuit of a type driven in an analog manner as is disclosed in the aforementioned Japanese Patent Application KOKOKU Publication No. 6-28491. The arrangement free from a substantial load loss is suitable for bypassing the large charging current $I_{charge}$.

On the positive terminal side of the next battery cell, e.g., the battery cell $1b$, which is not fully charged, the bypass current $I_{pass}$ combines with a current actually flowing in the battery cell $1a$ and is then supplied to the battery cell $1b$.

When the inter-electrode voltage V of the battery cell 1 becomes lower than a stationary operating voltage $V_{std}$ of the battery cell because of, e.g., the self-discharging action of the battery cell, the FET 21 which has been made once conductive operates to be turned OFF in combination with the hysteresis characteristic of the comparator circuit 25.

According to the charging control system (FIG. 1) comprised of the charging control units 5 each having the above construction and function and each connected between the two electrodes of a corresponding one of the serially-connected battery cells, the charging voltages V of the battery cells $1a$, $1b$, . . . , $1n$ are maintained at the fully charged voltage $V_{full}$ and an extra charging current $I_{charge}$ is bypassed through a concerned one or ones of the bypass circuits 11 of the charging control units $5a$, $5b$, . . . , $5n$. Therefore, the battery cells $1a$, $1b$, . . . , $1n$ can be prevented from being overcharged, the charged voltages of these battery cells can be equalized to make their characteristics equal to one another, and their service lives can be lengthened even if the charging and discharging operations are repeatedly effected.

To connect the charging control units 5 respectively with the serially-connected battery cells $1a$ to $1n$, it is preferable to mold each charging control unit 5 into one piece by use of insulative synthetic resin, with the positive and negative terminals 16 and 17 thereof exposed to its outer face, so that the charging control unit is permitted to be mounted directly between the two terminals of the battery cell concerned. Specifically, the individual unit is formed into a module structure having, by way of example, the thickness of 10 mm, the width of 50 mm and the length of 130 mm. This makes it possible to directly mount the charging control unit 5 between the terminals of the battery cell 1 so that the unit constitutes, in appearance, part of the battery cell. As a result, the charging control unit 5 can be made easy to handle, and can be used as a standard component part which ensures the stabilized characteristic of the battery cell.

Figure 7:
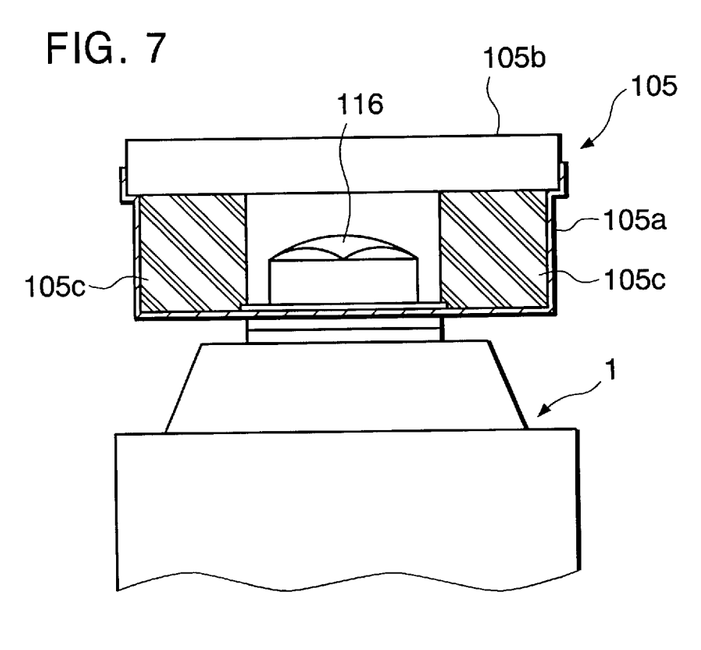
FIG. 7 is a fragmentary view, partly shown in cross section, of a charging control unit of module structure.

FIG. 7 shows an example of a charging control unit 5 formed into a module structure 105 (hereinafter referred to as module). This module 105 includes a casing $105a$ formed into a rectangular parallelepiped and having an open upper face, and a cover $105b$ formed with heat radiation fins and disposed to close the open upper face of the casing $105a$. The casing $105a$ is formed at its bottom face with two bolt insertion holes in which two bolts (one of which is shown by reference numeral 116) are respectively inserted. Each of these two bolts has a function, equivalent to that of a corresponding one of the terminals 16 and 17 shown in FIG. 2, of electrically connecting the charging control unit 5 with the battery cell 1 and a function of mechanically combining the unit 5 with the battery cell 1. The charging control unit 5 is disposed in the interior of the casing 105a and is sealed with mold-sealing, as shown at reference numeral 105c. The two bolts are disposed so as to be exposed in the interior of the casing 105a.

Figure 4:
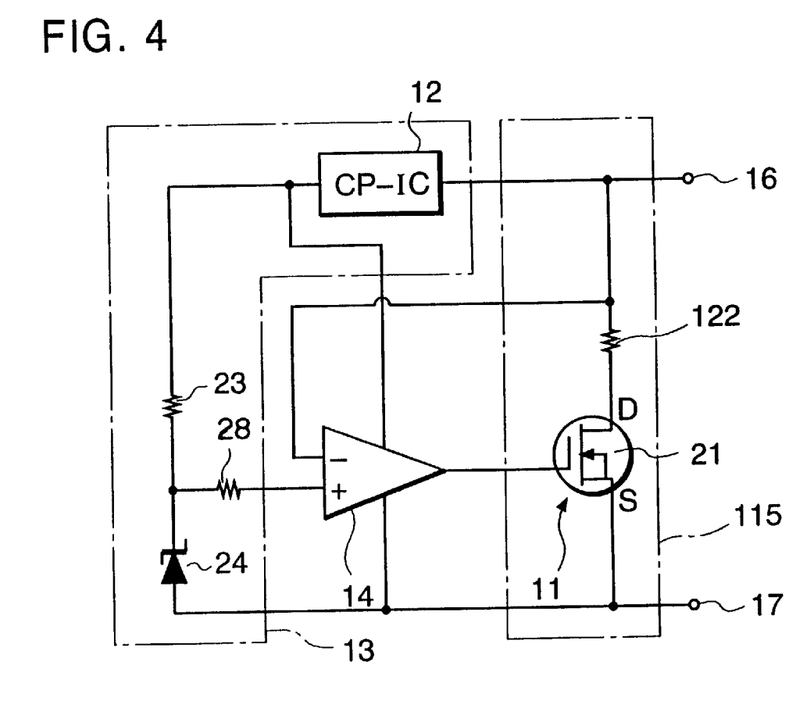
FIG. 4 is a schematic circuit diagram showing a charging control unit according to another embodiment of this invention.

Next, a charging control system according to a second embodiment of this invention is explained and is shown in FIG. 4.

The charging control system of this embodiment is different from the system of the first embodiment in the bypass current adjuster circuits of the charging control units which constitute the system. Unlike the negative feedback circuit 15 (bypass current adjuster circuit) of the first embodiment in which a voltage detected by the resistor 22 connected on the source electrode S side of the field-effect transistor 21 is fed back to the high-gain amplifier circuit 14, a bypass current adjuster circuit 115 of this embodiment includes a current detection resistor 122 connected between the drain electrode D of a field-effect transistor 21 and the positive terminal 16 of the charging control unit and operates to decrease the drain-to-source voltage of the field-effect transistor 21 by an amount corresponding to a voltage appearing across the resistor 122 and applied to inverting input of amplifier circuit 14, so as to keep the bypass current constant. In this embodiment, a resistor 28 is connected from the node between the resistor 23 and voltage regulator 24 to the non-inverting input terminal of amplifier circuit 14 which also acts as the comparator circuit.

As the resistor 122, a so-called kappa type resistor, for instance, is used which has a low thermal resistance loss approximately equal to that of the field-effect transistor 21. With this arrangement, a heat generation loss (the source-to-drain voltage) of the field-effect transistor 21 can be suppressed by an amount corresponding to the voltage drop in the resistor 122 observed when the bypass current flows therethrough, so that the stable operation of the field-effect transistor 21 can be ensured. Further, a load imposed on the field-effect transistor 21 can be reduced by increasing the load loss in the resistor 122.

Figure 5:
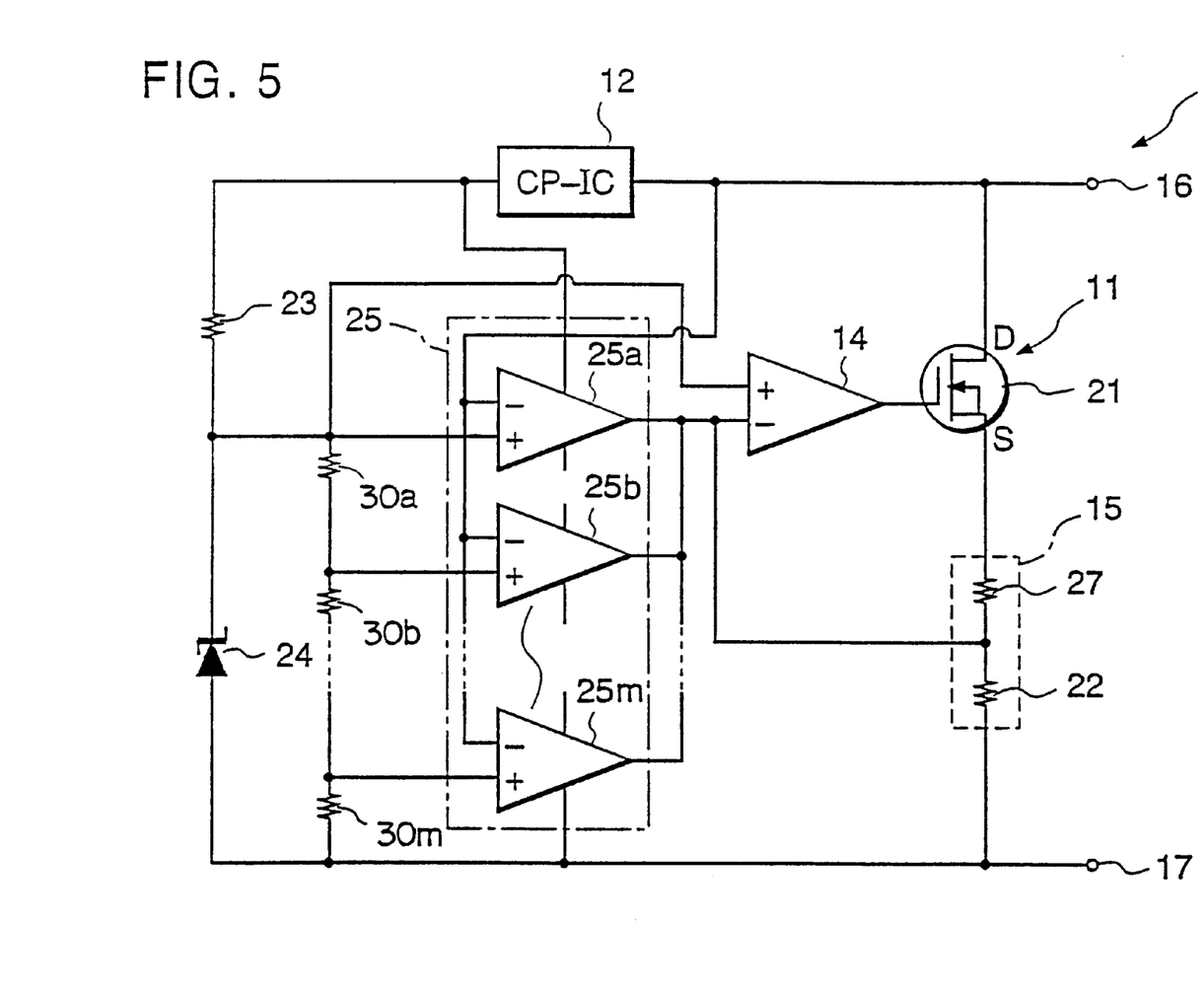
FIG. 5 is a schematic circuit diagram showing a charging control unit according to still another embodiment of this invention.

Next, a charging control system according to a third embodiment of this invention is explained and shown in FIG. 5.

In the first embodiment, at the time when the interelectrode voltage V of a battery cell has reached the fully charged voltage $V_{full}$, the charging current $I_{charge}$ for the battery cell is forcedly bypassed at once by use of the associated charging control unit 5 for preventing the battery cell from being overcharged. In this embodiment, the value of the bypass current flowing through the bypass circuit 11 is changed in a stepwise fashion according to the interelectrode voltage V of the battery cell 1.

As shown in FIG. 5, a charging control unit 6 for realizing the stepwise current limiting (bypassing) process is constructed in basically the same manner as the charging control unit 5 shown in FIG. 2 but it is different from the charging control unit 5 in that a plurality of comparator circuits 25a, 25b, . . . , 25m connected in parallel with one another are used instead of the single comparator circuit 25 shown in FIG. 2.

The first to m-th comparator circuits 25a, 25b, . . . , 25m each have an inverting input terminal thereof connected to a positive terminal 16 of the charging control unit 6 and a non-inverting input terminal thereof connected to one end of a corresponding one of resistors 30a, 30b, . . . 30m. These resistors are serially connected to thereby constitute a voltage divider circuit. More specifically, the non-inverting input terminal of the comparator circuit 25a is connected to a connection node (first connection node) between the resistor 30a and the cathode of the voltage regulator 24, and the non-inverting input terminal of the comparator circuit 25b is connected to a connection node (second connection node) between the resistors 30a and 30b. The non-inverting input terminal of the comparator circuit 25m is connected to a connection node (m-th connection node) between the resistor 30m and the resistor (not shown) adjacent thereto.

Figure 6:
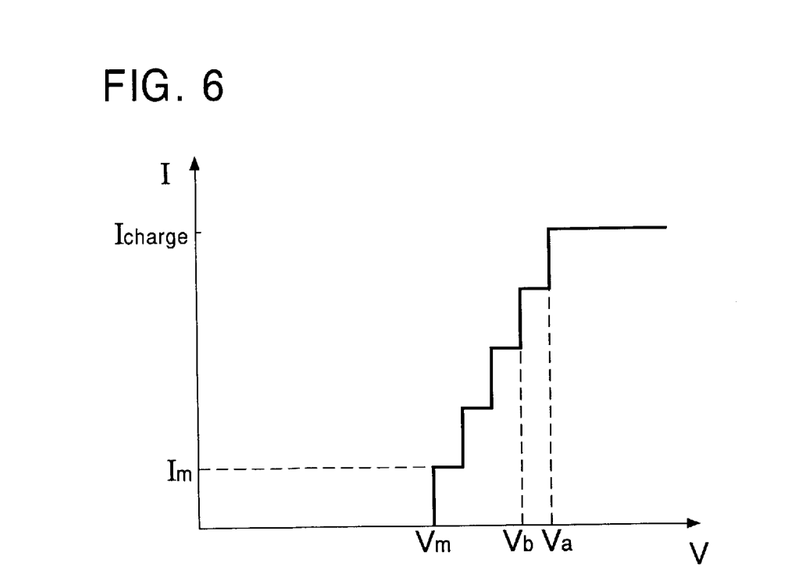
FIG. 6 is a graph showing the inter-electrode voltage-to-bypass current characteristic of the charging control unit shown in FIG. 5.

The opposite ends of the voltage divider circuit constituted by the resistors 30a to 30m are connected to the anode and cathode of the voltage regulator 24, respectively. First, second, . . . , and m-th reference voltages Va, Vb, . . . , and Vm (FIG. 6) which are different from one another appear on the first, second, . . . , and m-th connection nodes of the voltage divider circuit, respectively. The first reference voltage Va is set to, e.g., a value equal to the fully charged voltage $V_{full}$ of the battery cell 1. The i-th reference voltage Vi (i=b, . . . , m) is set to a value derived by subtracting a voltage which is (k−1) times (k=2, 3 . . . , 1) as larger as a preset voltage from the first reference voltage Va. The m-th reference voltage Vm is set to a value equal to the stationary operating voltage $V_{std}$ of the battery cell 1.

The j-th comparator circuit 25j (j=a, b, . . . , m) is operable to compare the inter-electrode voltage V of the battery cell 1 directly supplied at its inverting input terminal with the j-th reference voltage Vj (Vj=Va, Vb, . . . , Vm) supplied at its non-inverting input terminal, and output a j-th output voltage indicating the result of this comparison. The j-th output voltage has a value of "0" while the inter-electrode voltage V is lower than the j-th reference voltage Vj and has a negative value while the inter-electrode voltage V is higher than the j-th reference voltage Vj. The first to m-th output voltages are added together and then applied to the inverting input terminal of the amplifier circuit 14.

Serially-connected current detection resistors 22 and 27 are connected between the source electrode of the FET 21 and the negative terminal 17, and a voltage appearing on the connection node of the two resistors is fed back for negative feedback to the inverting input terminal of the amplifier circuit 14.

According to the charging control unit 6 with the above construction, when the inter-electrode voltage V of the battery cell 1 has reached the m-th reference voltage, that is, the stationary operating voltage $V_{std}$ of the battery cell 1, a low-level output voltage from the m-th amplifier 14m is applied to the inverting input terminal of the amplifier circuit 14, so that a high-level voltage serving as gate voltage is applied from the amplifier circuit 14 to the gate electrode of the FET 21, which high-level voltage varies depending on the difference between the low-level voltage and the reference voltage respectively applied to the two input terminals of the amplifier circuit 14. As a result, a drain current or bypass current having a value of Im (FIG. 6) corresponding to the gate voltage flows through the bypass circuit 11. Thereafter, as the inter-electrode voltage V increases, the absolute value of the total sum of the output voltages from the first to m-th comparator circuits 25a to 25m increases stepwise and hence the bypass current value increases stepwise, thereby causing the charging current actually supplied to the battery cell 1 to be reduced. When the inter-electrode voltage V has reached the first reference voltage, that is, the fully charged voltage $V_{full}$ of the battery cell 1, the entirety of the charging current $I_{charge}$ is forcedly bypassed and supply of current to the battery cell 1 is interrupted. As a result, the supply of the charging current $I_{charge}$ is interrupted at the time when the battery cell 1 is charged up to the fully charged voltage $V_{full}$. Thus, any overcharging of the battery cell can be prevented, while the battery cell is maintained in a constant charged state where its charged voltage is kept equal to the fully charged voltage $V_{full}$.

Even in the case of controlling the bypass current stepwise according to the inter-electrode voltage V as described above, switching actions of the comparator circuits 25a to 25m, which directly detect the inter-electrode voltage V of the battery cell 1 supplied via the positive terminal 16, can be made a high degree of sensitivity. Further, the field-effect transistor 21 simply operates to receive the outputs of the amplifier circuits 14a to 14m and increase the bypass current stepwise. This arrangement realizes an efficient bypass control operation suitable for bypassing the charging current $I_{charge}$ of large current, which control cannot be achieved by the impedance circuit of a type driven in an analog manner as is disclosed in Japanese Patent Application KOKOKU Publication No. 6-28491.

If, like the charging control unit 5, the charging control unit 6 is formed in a module structure by means of resin molding, handling thereof can be simplified. The number of the comparison circuits 25a to 25m used and the reference voltages Va to Vm set for these comparison circuits may be determined according to the charging level (charging voltage V) of the battery cell 1. In order to reduce the heat generation loss in the bypass circuit (semiconductor switching circuit) 11 in the charging control unit 6, plural pairs of amplifier circuits 14 and field-effect transistors 21 may be used. In this case, the amplifier and FET pairs are connected in parallel with one another however, these FETs 21 are independently turned ON or OFF.

This invention is not limited to the first, second and third embodiments and can be variously modified without departing form the technical scope thereof.

What is claimed is:

1. A charging control system for use with a battery charger for charging a battery array comprised of serially-connected battery cells, comprising:

charging control units which are the same in number to the battery cells, each of said charging control units being adapted to be connected in parallel with an associated one of the battery cells and wherein said each of the charging control units includes:

a bypass circuit connected in parallel with the associated one battery cell, said bypass circuit including a semiconductor switching device;

a reference voltage generator circuit for generating a reference voltage, wherein said reference voltage generator circuit includes a step-up circuit for increasing the inter-electrode voltage of the associated one battery cell by a predetermined magnitude and for outputting the stepped-up voltage as an output voltage, and a voltage regulator coupled to said output voltage for generating said reference voltage in response to said output voltage;

a comparator circuit for comparing an inter-electrode voltage of the associated one battery cell with the reference voltage, wherein said comparator circuit switches an operation state of said switching device from a cutoff state to a conductive state to thereby divert a charging current for the associated one battery cell to said bypass circuit when the inter-electrode voltage exceeds the reference voltage; and a bypass current adjuster circuit which is operable to keep an electric current diverted to and flowing through said bypass circuit constant.

2. The charging control system according to claim 1, wherein said semiconductor switching device is comprised of a high-power field-effect transistor.

3. The charging control system according to claim 1, wherein said bypass current adjuster circuit includes an amplifier circuit for receiving an output of said comparator circuit, a current detection resistor inserted in said bypass circuit, and a feedback resistor for inversely feeding back a voltage appearing across said current detection resistor to said amplifier circuit.

4. The charging control system according to claim 2, wherein said bypass current adjuster circuit includes a resistor inserted in said bypass circuit and operable to cause a drain electrode-to-source electrode voltage of said field-effect transistor to change according to the electric current flowing through said bypass circuit.

5. The charging control system according to claim 1, wherein said reference voltage generator circuit generates a plurality of different reference voltages;

said comparator circuit includes a plurality of comparators connected in parallel with one another; and each of said comparators has a first input terminal thereof directly supplied with the inter-electrode voltage of the associated one battery cell and a second input terminal thereof supplied with a corresponding one of the plurality of reference voltages, compares the inter-electrode voltage with the corresponding one reference voltage, and generates an output indicating a result of the comparison, the outputs of the plurality of comparators being added together and supplied to said semiconductor switching device.

6. The charging control system according to claim 1, wherein said each charging control unit is formed into a module structure in which said bypass circuit, said reference voltage generator circuit, said comparator circuit and said bypass current adjuster circuit are sealed with mold-sealing; and said module structure has two connector terminals thereof exposed to an external surface of the module structure and is adapted to be connected at its two connector terminals with positive and negative electrodes of the associated one battery cell.

7. The charging control system according to claim 1 wherein said predetermined magnitude is at least about twice the inter-electrode voltage.

8. The charging control system according to claim 1 wherein said step-up circuit comprises a voltage doubler.

9. The charging control system according to claim 8 wherein said voltage regulator comprises a semiconductor device connected in series with said voltage doubler.

10. A charging control unit for use with a battery charger operable to charge a battery array comprised of serially-connected battery cells, said charging control unit being adapted to be connected in parallel with an associated one of the battery cells, comprising:

a bypass circuit connected in parallel with the associated one battery cell, said bypass circuit including a semiconductor switching device;

a reference voltage generator circuit connected to an inter-electrode voltage of the associated battery cell for generating a reference voltage and wherein said reference voltage generator circuit includes a circuit for increasing the inter-electrode voltage of the associated one battery cell to a predetermined magnitude and outputting the increased voltage as an output voltage, and a voltage regulator connected to and being responsive to said output voltage for generating said reference voltage;

a comparator circuit for comparing an inter-electrode voltage of the associated one battery cell with the reference voltage, wherein said comparator circuit switches an operation state of said switching device from a cutoff state to a conductive state to thereby divert a charging current for the associated one battery cell to said bypass circuit when the inter-electrode voltage exceeds the reference voltage; and a bypass current adjuster circuit which is operable to keep an electric current diverted to and flowing through said bypass circuit constant.

11. The charging control unit according to claim 10, wherein said semiconductor switching device is comprised of a high-power field-effect transistor.

12. The charging control unit according to claim 10, wherein said bypass current adjuster circuit includes an amplifier circuit for receiving an output of said comparator circuit, a current detection resistor inserted in said bypass circuit, and a feedback resistor for inversely feeding back a voltage appearing across said current detection resistor to said amplifier circuit.

13. The charging control unit according to claim 11, wherein said bypass current adjuster circuit includes a resistor inserted in said bypass circuit and operable to cause a drain electrode-to-source electrode voltage of said field-effect transistor to change according to the electric current flowing through said bypass circuit.

14. The charging control unit according to claim 10, wherein said reference voltage generator circuit generates a plurality of different reference voltages;

said comparator circuit includes a plurality of comparators connected in parallel with one another; and each of said comparators has a first input terminal thereof directly supplied with the inter-electrode voltage of the associated one battery cell and a second input terminal thereof supplied with a corresponding one of the plurality of reference voltages, compares the inter-electrode voltage with the corresponding one reference voltage, and generates an output indicating a result of the comparison, the outputs of the plurality of comparators being added together and supplied to said semiconductor switching device.

15. The charging control unit according to claim 10, wherein said charging control unit is formed into a module structure in which said bypass circuit, said reference voltage generator circuit, said comparator circuit and said bypass current adjuster circuit are sealed with mold-sealing; and said module structure has two connector terminals thereof exposed to an external to an external surface of the module structure and is adapted to be connected at its two connector terminals with positive and negative electrodes of the associated one battery cell.

16. The charging control system according to claim 10 wherein said step-up circuit and said voltage regulator are connected in series across said inter-electrode voltage.

17. The charging control system according to claim 16 wherein said step-up circuit comprises a voltage doubler.

18. The charging control system according to claim 16 wherein said voltage regulator comprises a semiconductor voltage regulator.

\* \* \* \* \*